(12) United States Patent
Sugawara (10) Patent No.: US 8,611,361 B2
(45) Date of Patent: Dec. 17, 2013

(54) SWITCHING HUB, LINE CARD AND FRAME RELAY METHOD

(75) Inventor: Shingo Sugawara, Tsuchiura (JP)

(73) Assignee: Hitachi Cable, Ltd., Tokyo (JP)

( * ) Notice: Subject to any disclaimer, the term of this patent is extended or adjusted under 35 U.S.C. 154(b) by 127 days.

(21) Appl. No.: 12/970,188

(22) Filed: Dec. 16, 2010

(65) Prior Publication Data

US 2011/0149986 A1    Jun. 23, 2011

(30) Foreign Application Priority Data

Dec. 17, 2009  (JP) ................................ 2009-286319

(51) Int. Cl.
   *H04L 12/28* (2006.01)
(52) U.S. Cl.
   USPC ........................................................ 370/401
(58) Field of Classification Search
   USPC ................... 370/229, 331, 389, 401, 490
   See application file for complete search history.

(56) References Cited

U.S. PATENT DOCUMENTS

| | | | |
|---|---|---|---|
| 6,553,029 B1* | 4/2003 | Alexander | 370/389 |
| 7,593,400 B2* | 9/2009 | Zelig et al. | 370/389 |
| 2002/0136163 A1* | 9/2002 | Kawakami et al. | 370/229 |
| 2008/0068985 A1* | 3/2008 | Mieno | 370/217 |
| 2009/0316700 A1* | 12/2009 | White et al. | 370/392 |
| 2010/0182920 A1* | 7/2010 | Matsuoka | 370/252 |
| 2010/0284416 A1* | 11/2010 | Aoshima | 370/401 |

FOREIGN PATENT DOCUMENTS

| | | |
|---|---|---|
| JP | 2006-135723 A | 5/2006 |
| JP | 2007-221608 A | 8/2007 |
| JP | 2009-027758 A | 2/2009 |

OTHER PUBLICATIONS

Japanese Office Action dated May 28, 2013 issued in JP 2009-286319.

* cited by examiner

*Primary Examiner* — Dang Ton
*Assistant Examiner* — Nourali Mansoury
(74) *Attorney, Agent, or Firm* — Scully, Scott, Murphy & Presser PC (57) ABSTRACT

A switching hub includes a plurality of ports including receiving ports for receiving a frame from outside and transmitting ports for transmitting the frame to outside, a distributed ID calculation portion for calculating a distributed ID based on the frame received by one of the receiving ports of the plurality of ports and adding the distributed ID to the frame, a first distribution table that stores a port ID for identifying the transmitting port for transmitting the frame associated with the distributed ID to outside, a second distribution table that stores the port ID associated with the distributed ID so that the correspondence relation is different from that of the first distribution table, a distribution table identification information adding portion for adding first table identification information for identifying the first distribution table or second table identification information for identifying the second distribution table to the frame, and a transmission distribution table access portion for obtaining the port ID stored in the first or second distribution table so as to be associated with the distributed ID that is added to the frame by referring to the first distribution table when the first table identification information is added to the frame and by referring to the second distribution table when the second table identification information is added to the frame.

6 Claims, 8 Drawing Sheets

| LAG ID | DISTRIBUTED ID | PORT ID |
|---|---|---|
| 1 | 0 | 3/1 |
|   | 1 | 4/1 |
|   | 2 | 5/1 |
|   | 3 | 3/1 |
|   | 4 | 4/1 |
|   | 5 | 5/1 |
|   | 6 | 3/1 |
|   | 7 | 4/1 |
| 2 | ⋮ | ⋮ |
| ⋮ | ⋮ | ⋮ |
| n | ⋮ | ⋮ |

| LAG ID | DISTRIBUTED ID | PORT ID |
|---|---|---|
| 1 | 0 | 3/1 |
|   | 1 | 5/1 |
|   | 2 | 3/1 |
|   | 3 | 5/1 |
|   | 4 | 3/1 |
|   | 5 | 5/1 |
|   | 6 | 3/1 |
|   | 7 | 5/1 |
| 2 | ⋮ | ⋮ |
| ⋮ | ⋮ | ⋮ |
| n | ⋮ | ⋮ |

SWITCHING HUB, LINE CARD AND FRAME RELAY METHOD

The present application is based on Japanese Patent Application No. 2009-286319 filed on Dec. 17, 2009, the entire contents of which are incorporated herein by reference.

BACKGROUND OF THE INVENTION

1. Field of the Invention

The invention relates to a switching hub, a line card and a frame relay method.

2. Description of the Related Art

A conventional network relay apparatus is known in which plural physical ports can be logically bundled and treated as one logical port, and which is provided with a packet input portion for inputting a packet, an extracting portion by which destination address information included in the packet and identification information for identifying applications using the packet are extracted from the packet to be output to the logical port, a physical port selecting portion for selecting a physical port used for outputting the packet from the physical ports composing the logical port depending on the destination address information and the identification information, and a packet output portion for outputting the packet to the destination address by using the selected physical port (see, e.g., JP-A-2009-027758).

The network relay apparatus described in JP-A-2009-027758 can perform relay processing of network more efficiently and can support high speed communication.

SUMMARY OF THE INVENTION

However, in the network relay apparatus such as described in JP-A-2009-027758, a distribution table for appropriately distributing packets or frames to a transmitting port is provided to each line card. In addition, it is necessary to delete data registered in the distribution table once and to subsequently update the registered data therein by synchronization between each line card in a transient state for changing the registered data in the distribution table in order to prevent the same frame from being transmitted from plural ports. Therefore, a frame loss occurs when a port is damaged and recovered and when the port is manually switched.

Therefore, it is an object of the invention to provide a switching hub, a line card and a frame relay method in which a frame loss does not occur at the time of failure recovery and manual switchover of a port.

(1) According to one embodiment of the invention, a switching hub comprises:

a plurality of ports comprising receiving ports for receiving a frame from outside and transmitting ports for transmitting the frame to outside;

a distributed ID calculation portion for calculating a distributed ID based on the frame received by one of the receiving ports of the plurality of ports and adding the distributed ID to the frame;

a first distribution table that stores a port ID for identifying the transmitting port for transmitting the frame associated with the distributed ID to outside;

a second distribution table that stores the port ID associated with the distributed ID so that the correspondence relation is different from that of the first distribution table;

a distribution table identification information adding portion for adding first table identification information for identifying the first distribution table or second table identification information for identifying the second distribution table to the frame; and a transmission distribution table access portion for obtaining the port ID stored in the first or second distribution table so as to be associated with the distributed ID that is added to the frame by referring to the first distribution table when the first table identification information is added to the frame and by referring to the second distribution table when the second table identification information is added to the frame.

In the above embodiment (1) of the invention, the following modifications and change can be made.

(i) The plurality of ports compose a LAG (Link Aggregation Group), and the first and second distribution tables store port IDs of the ports composing the LAG so as to be associated with the distributed ID.

(ii) The transmission distribution table access portion refers to the first or second distribution table in a case that the frame is relayed by flooding.

(iii) The switching hub further comprises:

a plurality of line cards, wherein each line card comprises a plurality of ports comprising receiving ports for receiving a frame from outside and transmitting ports for transmitting the frame to outside, and the LAG is composed of the plurality of ports selected from the plurality of ports provided on the plurality of line cards.

(iv) The line cards each comprise a receiving unit for receiving the frame from outside and a transmitting unit for transmitting the frame to outside, the receiving unit comprises the distributed ID calculation portion and the distribution table identification information adding portion, and the transmitting unit comprises the first and second distribution tables and the transmission distribution table access portion.

(v) The receiving unit comprises:

a FDB (Forwarding Database) for storing a MAC (Media Access Control) address and the port ID or a LAG ID for identifying the LAG as registered data;

a FDB access circuit having a function of searching a destination in the FDB;

a LAG distribution table for distributing the LAG ID, the distributed ID and the port ID so as to be associated with each other; and a reception distribution table access portion for obtaining the port ID stored so as to be associated with the LAG ID detected by the FDB access circuit and with the distributed ID added in the frame by referring to the LAG distribution table.

(2) According to another embodiment of the invention, a line card provided in a switching hub comprises:

a plurality of ports comprising receiving ports for receiving a frame from outside and transmitting ports for transmitting the frame to outside;

a distributed ID calculation portion for calculating a distributed ID based on the frame received by one of the receiving ports of the plurality of ports and adding the distributed ID to the frame;

a first distribution table that stores a port ID for identifying the transmitting port for transmitting the frame associated with the distributed ID to outside;

a second distribution table that stores the port ID associated with the distributed ID so that the correspondence relation is different from that of the first distribution table;

a distribution table identification information adding portion for adding first table identification information for identifying the first distribution table or second table identification information for identifying the second distribution table to the frame; and a transmission distribution table access portion for obtaining the port ID stored in the first or second distribution table so as to be associated with the distributed ID that is added to the frame by referring to the first distribution table when the first table identification information is added to the frame and by referring to the second distribution table when the second table identification information is added to the frame.

In the above embodiment (2) of the invention, the following modifications and change can be made.

(vi) The line card further comprises:
ports composing a LAG (Link Aggregation Group).

(vii) The transmission distribution table access portion refers to the first or second distribution table in a case that the frame is relayed by flooding.

(viii) The line card further comprises:
a receiving unit for receiving the frame from outside and a transmitting unit for transmitting the frame to outside,
wherein the receiving unit comprises the distributed ID calculation portion and the distribution table identification information adding portion, and
the transmitting unit comprises the first and second distribution tables and the transmission distribution table access portion.

(ix) The receiving unit comprises:
a FDB (Forwarding Database) for storing a MAC (Media Access Control) address and the port ID or a LAG ID for identifying the LAG as registered data;
a FDB access circuit having a function of searching a destination in the FDB;
a LAG distribution table for distributing the LAG ID, the distributed ID and the port ID so as to be associated with each other; and
a reception distribution table access portion for obtaining the port ID stored so as to be associated with the LAG ID detected by the FDB access circuit and with the distributed ID added in the frame, by referring to the LAG distribution table.

(3) According to another embodiment of the invention, a frame relay method comprises:
a distributed ID calculating step for calculating a distributed ID based on a frame received by one of a plurality of receiving ports and adding the distributed ID to the frame, the receiving port receiving the frame from outside;
a distribution table identification information adding step for adding first or second table identification information to the frame, the first table identification information identifying a first distribution table that stores a port ID for identifying a transmitting port for transmitting the frame so as to be associated with the distributed ID and the second table identification information identifying a second distribution table that stores the port ID associated with the distributed ID so that the correspondence relation is different from that of the first distribution table; and
a transmission distribution table access step for obtaining the port ID stored in the first or second distribution table so as to be associated with the distributed ID that is added to the frame by referring to the first distribution table when the first table identification information is added to the frame and by referring to the second distribution table when the second table identification information is added to the frame.

In the above embodiment (3) of the invention, the following modifications and change can be made.

(x) The plurality of ports compose a LAG (Link Aggregation Group), and the first and second distribution tables store port IDs of the ports composing the LAG so as to be associated with the distributed ID.

(xi) The first or second distribution table is referenced in the transmission distribution table access step in a case that the frame is relayed by flooding.

(xii) The frame relay method applies to a switching hub comprising a plurality of line cards,
wherein the line cards each comprise:
a plurality of ports comprising receiving ports for receiving a frame from outside and transmitting ports for transmitting the frame to outside; and
the LAG is composed of the plurality of ports selected from the plurality of ports provided on the plurality of line cards.

Points of the Invention

According to one embodiment of the invention, a switching hub is constructed such that a line card preliminarily includes a first distribution table and a second distribution table, whereby transmitting ports to transmit a frame can be simultaneously switched only by switching a table to be used from the first distribution table to the second distribution table or the other way round when failure such as a damage occurs in the transmitting ports to transmit the frame and the transmitting ports are subsequently recovered or when the transmitting port currently in use are changed to another transmitting port and the other transmitting port is subsequently changed back to the original transmitting port. This allows the switching hub to switch the port without any frame loss when the transmitting ports are recovered after failure such as damage occurs in any of the transmitting ports or after the transmitting port currently in use is changed to another port.

BRIEF DESCRIPTION OF THE DRAWINGS

Next, the present invention will be explained in more detail in conjunction with appended drawings, wherein.

DETAILED DESCRIPTION OF THE PREFERRED EMBODIMENTS

Summary of an Embodiment

Provided is a switching hub comprising plural ports composed of receiving ports for receiving a frame from outside and transmitting ports for transmitting the frame to outside. The switching hub is provided with a distributed ID calculation portion for calculating a distributed ID based on the frame received by one of the receiving ports of the plural ports and adding the distributed ID to the frame, a first distribution table that stores a port ID for identifying the transmitting port for transmitting the frame associated with the distributed ID to outside, a second distribution table that stores the port ID to be associated with the distributed ID so that the correspondence relation is different from that of the first distribution table, a distribution table identification information adding portion for adding first table identification information for identifying the first distribution table or second table identification information for identifying the second distribution table to the frame, and a transmission distribution table access portion for obtaining the port ID stored in the first or second distribution table so as to be associated with the distributed ID that is added to the frame by referring to the first distribution table when the first table identification information is added to the frame and by referring to the second distribution table when the second table identification information is added to the frame.

Embodiment

Figure 1:
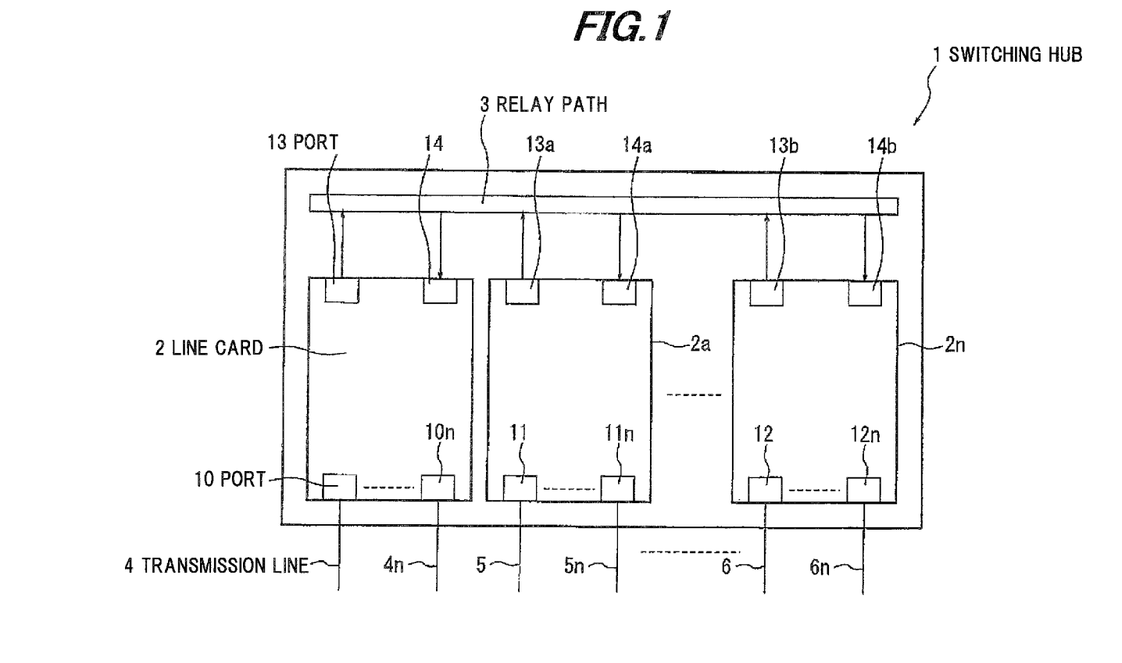
FIG. 1 is a configuration diagram showing a switching hub in an embodiment of the present invention.
Figure 2:
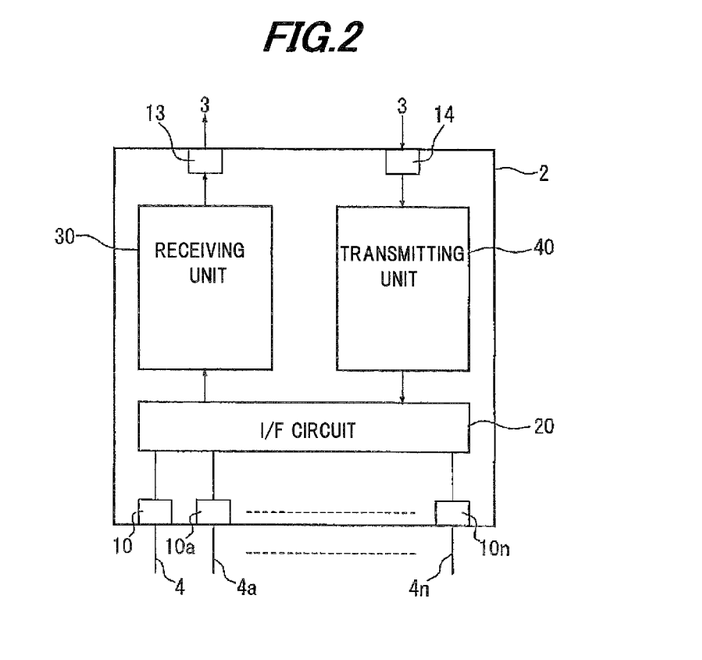
FIG. 2 is a functional configuration block diagram showing the switching hub in the embodiment of the invention.

FIG. 1 shows a schematic configuration of a switching hub in an embodiment of the invention, and FIG. 2 shows a schematic functional configuration of a line card in the embodiment of the invention.

Configuration Overview of Switching Hub 1 and Line Card 2

A switching hub 1 in the embodiment of the invention is a chassis-type switching hub for relaying information such as a frame, and is provided with plural line cards (e.g., line cards 2, 2a and 2n) and a relay path 3 as a communication path for relaying information such as a frame between plural line cards. Each line card has ports connected to the relay path 3 (e.g., ports 13 and 14 in the line card 2, ports 13a and 14a in the line card 2a, and ports 13b and 14b in the line card 2n), and a port connected to a transmission line (e.g., transmission lines 4, 4n, 5, 5n, 6 and 6n) (e.g., a port 10 included in the line card 2 is connected to the transmission line 4, and ports 10n, 11, 11n, 12 and 12n are respectively connected to the transmission lines 4n, 5, 5n, 6 and 6n in the same manner). In the present embodiment, a Link Aggregation Group (LAG) is composed of plural ports which are selected from the ports included in each line card and connected to the transmission lines. Here, the LAG is a technology specified in IEEE Std 802.3-2005, in which one logical line is formed by bundling plural physical lines. Since plural line cards each have the same configuration and function in the present embodiment, the line card 2 will be described in detail below.

As shown in FIG. 2, the line card 2 is provided with plural ports composed of plural receiving ports for receiving information such as a frame from outside and plural transmitting ports for transmitting the frame to outside (e.g., ports 10, 10a and 10n), an I/F circuit 20 as an interface portion for controlling transmission and reception of the information at the plural ports, a receiving unit 30 for determining a port to transmit the received frame, and a transmitting unit 40 for transmitting the frame from a predetermined port based on the determination of the receiving unit 30.

I/F Circuit 20

The I/F circuit 20 receives a frame from any one port of the plural receiving ports which received it, and provides the frame to the receiving unit 30. The I/F circuit 20 adds an internal header to the received frame, stores a port ID of the port receiving the frame in the internal header, and subsequently provides the frame having the internal header to the receiving unit 30.

In addition, the I/F circuit 20 transmits, from a predetermined port, the frame received from the transmitting unit 40.

The I/F circuit 20 provides the frame to a port which is determined as a transmitting port in a transmitting port bitmap of the internal header added to the received frame. The I/F circuit 20 deletes the internal header added to the frame at the time of providing the frame to the port.

Receiving Unit 30

Figure 3A:
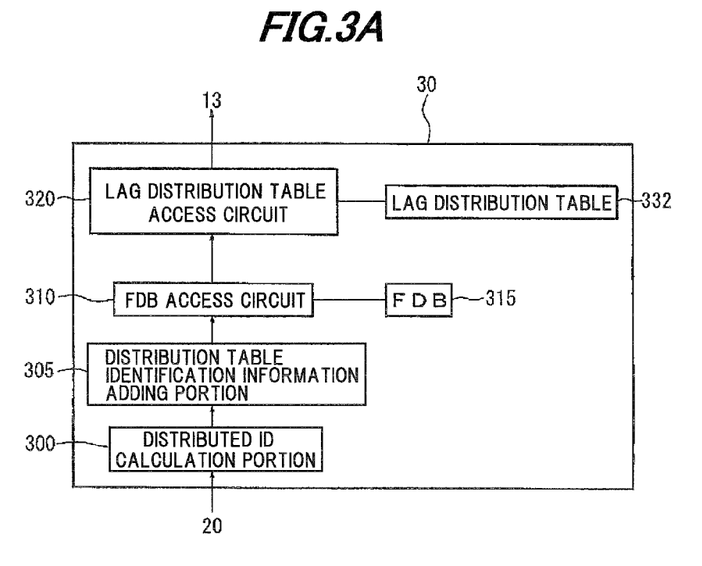
FIG. 3A is a functional configuration block diagram showing a receiving unit included in a line card in the embodiment.

FIG. 3A shows an example of functional configuration of a receiving unit included in a line card in the embodiment.

The receiving unit 30 in the present embodiment has a distributed ID calculation portion 300, a distribution table identification information adding portion 305, a FDB access circuit 310, a FDB 315, a LAG distribution table access circuit 320 as a reception distribution table access portion, and a LAG distribution table 332.

Distributed ID Calculation Portion 300

The distributed ID calculation portion 300 calculates a distributed ID based on a frame received by one port of the plural receiving ports, and adds the calculated distributed ID to the frame. For example, the distributed ID calculation portion 300 receives, from the I/F circuit 20, a frame received by any one of the plural ports and calculates a distributed ID by using a MAC (Media Access Control) address included in the frame. The distributed ID calculation portion 300 then adds the calculated distributed ID to the internal header of the frame. The distributed ID calculation portion 300 provides the frame with the distributed ID added thereto to the distribution table identification information adding portion 305.

Distribution Table Identification Information Adding Portion 305

The distribution table identification information adding portion 305 determines which one of a first distribution table 330 and a second distribution table 335 included in the transmitting unit 40 is used, depending on communication status of the plural ports composing the LAG. In detail, the distribution table identification information adding portion 305 adds first table identification information for identifying the first distribution table 330 to the frame received from the distributed ID calculation portion 300 when failure does not occur in any of the plural ports composing the LAG or when the plural transmitting ports currently in use are continuously used without change.

Meanwhile, the distribution table identification information adding portion 305 acids second table identification information for identifying the second distribution table 335 to the frame received from the distributed ID calculation portion 300 when failure occurs in any of the plural ports composing the LAG or when any or all of the plural ports in use are changed to other transmitting ports.

The distribution table identification information adding portion 305 adds the first table identification information (e.g., "0") or the second table identification information (e.g., "1") to the internal header of the frame by, e.g., using a region of 1 bit in the internal header of the frame. The distribution table identification information adding portion 305 provides the frame with the first or second table identification information added thereto to the FDB access circuit 310. It should be noted that, although the distribution table identification information adding portion 305 is placed posterior to the distributed ID calculation portion 300 in the present embodiment, it is not limited thereto. The distribution table identification information adding portion 305 may be placed posterior to, e.g., the LAG distribution table access circuit 320.

FDB Access Circuit 310 and FDB 315

In a Forwarding Database (FDB) 315, at least a MAC address included in the frame and a port ID or a LAG ID as a port identifier for uniquely identifying the port which receives the frame are stored as the registered data.

The FDB access circuit 310 has a function of searching in the FDB 315 using source and destination MAC addresses which are included in the frame received from the distribution table identification information adding portion 305, as well as a function of changing the registered data in the FDB 315. In other words, the FDB access circuit 310 has functions of learning the source MAC address and implementing the destination search of the frame, etc.

The FDB access circuit 310 compares, e.g., a destination MAC address included in the frame with the added distributed ID received from the distribution table identification information adding portion 305 with a MAC address stored in the FDB 315. In addition, the FDB access circuit 310 provides the frame to the LAG distribution table access circuit 320 by a flooding relay when it is judged that a MAC address same as the destination MAC address is not stored in the FDB 315. By the FDB access circuit 310, an identifier for identifying the flooding is stored as the destination in the internal header of the frame when providing the frame to the LAG distribution table access circuit 320 by the flooding relay.

In addition, as a result of comparing the destination MAC address included in the frame received from the distribution table identification information adding portion 305 with the MAC address stored in the FDB 315, when it is judged that a MAC address same as the destination MAC address is stored in the FDB 315 as well as when a port ID stored so as to be associated with the MAC address is detected in the FDB 315, the FDB access circuit 310 stores the port ID as a destination in the internal header of the frame. The FDB access circuit 310 then provides the frame with the internal header including the destination port ID to the LAG distribution table access circuit 320 by a forwarding relay (unicast).

In addition, as a result of comparing the destination MAC address included in the frame received from the distribution table identification information adding portion 305 with the MAC address stored in the FDB 315, when it is judged that a MAC address same as the destination MAC address is stored in the FDB 315 as well as when a LAG ID stored so as to be associated with the MAC address is detected in the FDB 315, the FDB access circuit 310 provides the frame together with the LAG ID to the LAG distribution table access circuit 320.

LAG Distribution Table 332

The LAG distribution table 332 stores a port ID for identifying a port which is a transmitting port for transmitting a frame associated with a LAG ID and with a distributed ID to outside. In the present embodiment, the plural line cards included in the switching hub 1 each have the same LAG distribution table 332. The present embodiment shows an example in which a LAG with LAG ID "1" is composed of three ports with port IDs of "3/1", "4/1" and "5/1". Here, "3/1" means to identify the first port of the third line card.

Figure 3B:
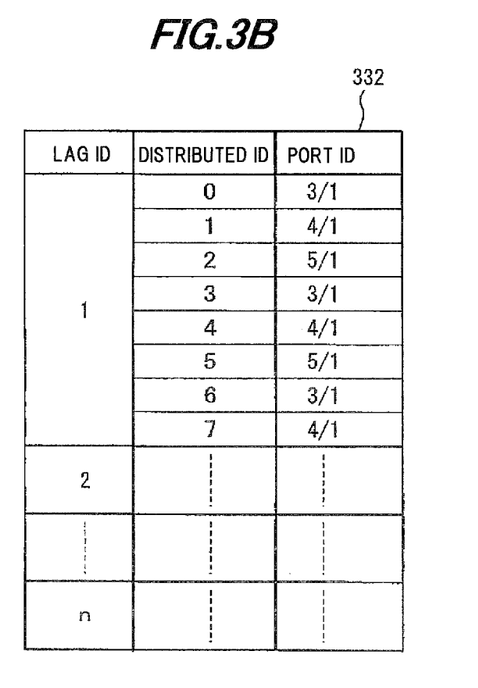
FIG. 3B is a diagram showing a data structure when a LAG distribution table included in the receiving unit of the line card in the embodiment is in a normal state.

FIG. 3B shows a data structure of the LAG distribution table included in the receiving unit of the line card in the present embodiment in a normal state in which all of three ports with port IDs of "3/1", "4/1" and "5/1" composing the LAG with LAG ID "1" are usable. The port IDs "3/1", "4/1" and "5/1" are stored so as to be associated with the distributed IDs "0" to "7". In the present embodiment, since there are eight distributed IDs, "0" to "7", it is possible to compose a LAG from up to eight ports. The number of distributed IDs is increased for composing the LAG from eight or more ports.

Figure 3C:
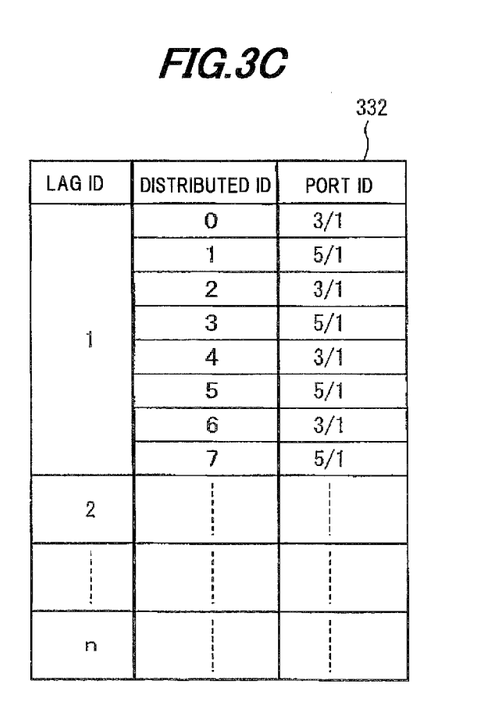
FIG. 3C is a diagram showing a data structure of the LAG distribution table included in the receiving unit of the line card in the embodiment when a port with port ID "4/1" is unusable and is rewritten.

FIG. 3C shows a data structure of the LAG distribution table included in the receiving unit of the line card in the present embodiment when the port with port ID "4/1" is unusable and is rewritten. The port IDs "3/1" and "5/1" are stored so as to be associated with the distributed IDs "0" to "7".

As shown in FIG. 3B, when failure does not occur in any of the plural ports composing the LAG or when the plural transmitting ports currently in use are continuously used without change, i.e., when in a normal state, the LAG distribution table 332 included in the receiving unit 30 stores, e.g., the port ID "4/1". Here, if the port ID "4/1" becomes unusable, the LAG distribution table access circuit 320 rewrites the data stored in the LAG distribution table 332 to, e.g., that shown in FIG. 3C.

LAG Distribution Table Access Circuit 320

When the frame is received together with the LAG ID from the FDB access circuit 310, the LAG distribution table access circuit 320 refers to the LAG distribution table 332 using the LAG ID and the distributed ID added to the internal header of the frame. The port ID, which is stored in the LAG distribution table 332 associated with the LAG ID as well as with the distributed ID, is then stored as a destination port in the internal header of the frame. The LAG distribution table access circuit 320 provides the frame storing the port ID of the destination from the port 13 to the relay path 3.

In addition, when the frame received from the FDB access circuit 310 is a frame relayed by forwarding and when the port ID of the destination is included in the internal header, the LAG distribution table access circuit 320 provides the frame without change from the port 13 to the relay path 3.

Furthermore, when the frame received from the FDB access circuit 310 is a frame relayed by flooding, the LAG distribution table access circuit 320 provides the frame without change from the port 13 to the relay path 3.

Note that, the distributed ID added to the frame is not essential when the frame with the port ID stored in the internal header is relayed by forwarding, and the distributed ID can be deleted from the frame by the FDB access circuit 310 or the LAG distribution table access circuit 320.

Relay Path 3

The relay path 3 receives the frame from the receiving unit 30, and relays the aforementioned frame to the transmitting unit 40 of the line card which includes a destination port. When the port ID is stored as a destination in the internal header of the frame received from the receiving unit 30, the relay path 3 relays the frame to the line card which has the port with the aforementioned port ID. When a flooding identifier is stored as a destination in the internal header of the frame received from the receiving unit 30, the relay path 3 relays the frame to all line cards except the one which has received the frame.

Transmitting Unit 40

Figure 4:
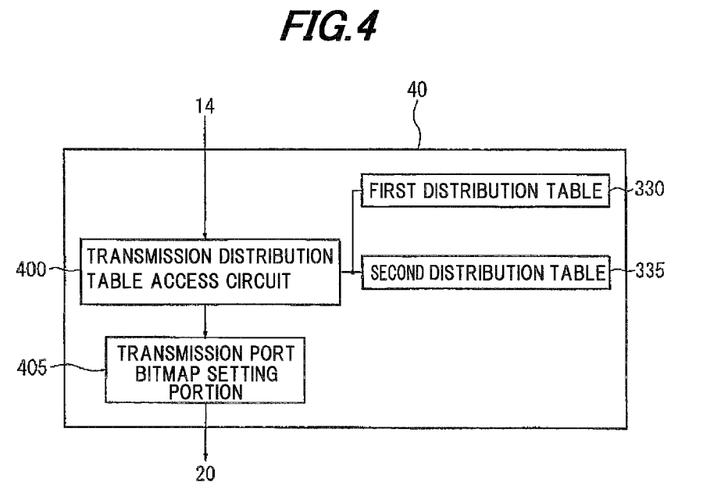
FIG. 4 is a functional configuration block diagram showing a transmitting unit included in a line card in the embodiment.

FIG. 4 shows an exemplary functional configuration of a transmitting unit included in the line card in the embodiment.

The transmitting unit 40 in the present embodiment has a transmission distribution table access circuit 400 as a transmission distribution table access portion, a transmission port bitmap setting portion 405, a first distribution table 330 and a second distribution table 335.

First Distribution Table 330 and Second Distribution Table 335

The first distribution table 330 and the second distribution table 335 store a port ID for identifying a port which is a transmitting port for transmitting a frame associated with a distributed ID to outside.

Figure 5A:
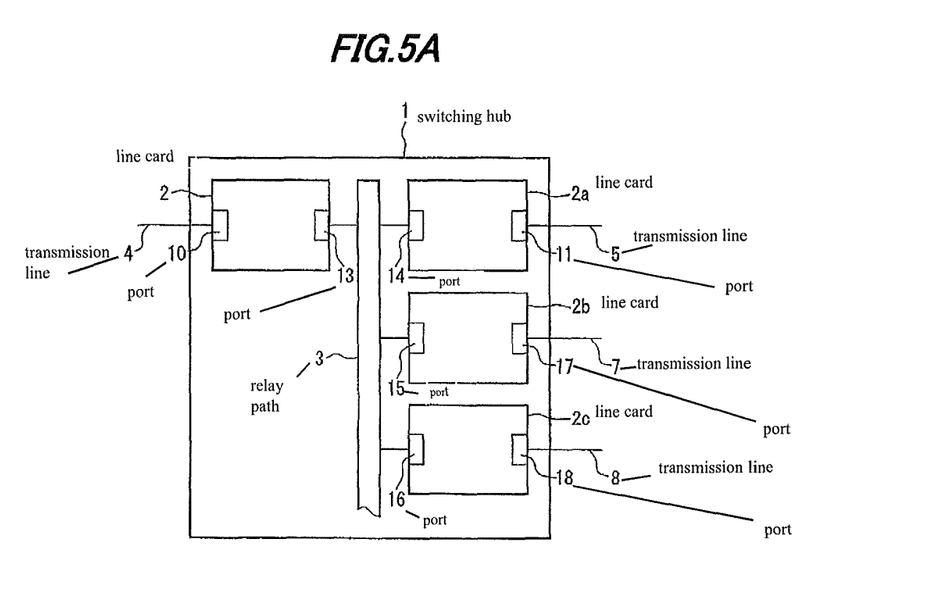
FIG. 5A is a diagram showing a schematic operation of the switching hub in the embodiment.
Figure 5B:
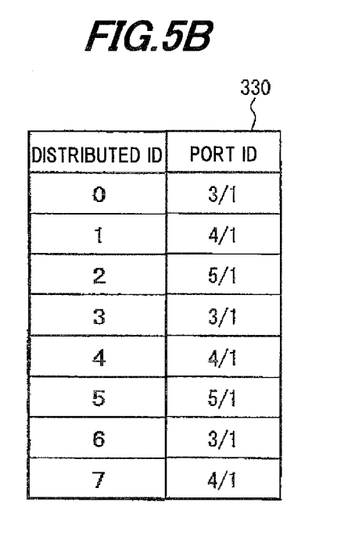
FIG. 5B is a diagram showing a data structure of a first distribution table in the embodiment.

FIG. 5B shows a data structure of the first distribution table 330. The first distribution table 330 is used, e.g., when failure does not occur in the plural ports composing the LAG or when the plural transmitting ports currently in use are continuously used without change. FIG. 5B shows a data structure in a normal state in which all of three ports with port IDs of "3/1", "4/1" and "5/1" composing the LAG with LAG ID "1" are usable, and the port IDs "3/1", "4/1" and "5/1" are stored so as to be associated with the distributed IDs "0" to "7".

Figure 5C:
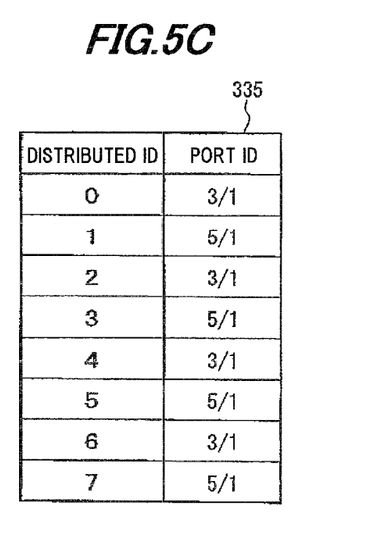
FIG. 5C is a diagram showing a data structure of a second distribution table in the embodiment.

FIG. 5C shows a data structure of the second distribution table 335. The second distribution table 335 is used, e.g., when failure occurs in any of the plural ports composing the LAG or when any or all of the plural transmitting ports in use are changed to other transmitting ports. FIG. 5C shows a data structure when the port with port ID "4/1" among three ports with port IDs of "3/1", "4/1" and "5/1" composing the LAG with LAG ID "1" is unusable, and the port IDs "3/1" and "5/1" are stored so as to be associated with the distributed IDs "0" to "7".

Transmission Distribution Table Access Circuit 400

In a case that an identifier which identifies the flooding (or an identifier which indicates multicast) is stored as a destination in the internal header of the frame, the transmission distribution table access circuit 400 refers to the first distribution table 330 when the first table identification information is added to the frame, and refers to the second distribution table 335 when the second table identification information is added to the frame.

The transmission distribution table access circuit 400 refers to the first distribution table 330 or the second distribution table 335 by using, e.g., the distributed ID added to the frame. The transmission distribution table access circuit 400 then obtains a port ID which is stored in the first distribution table 330 or the second distribution table 335 so as to be associated with the aforementioned distributed ID, and provides the frame together with the aforementioned port ID to the transmission port bitmap setting portion 405. The port ID obtained from the first distribution table 330 or the second distribution table 335 may be stored in the internal header of the frame together with an identifier for identifying the flooding as a destination.

In addition, when a port ID is stored as a destination in the internal header of the frame, the transmission distribution table access circuit 400 provides the frame to the transmission port bitmap setting portion 405 without referring to the first distribution table 330 or the second distribution table 335.

Transmission Port Bitmap Setting Portion 405

The transmission port bitmap setting portion 405 sets a transmission bitmap to the internal header of the frame. The transmission bitmap has, for example, as many bits as required for the number of ports connected to a transmission line of the line card, and each of plural bits is associated with each of plural ports. Then, the bit associated with a port to be a transmitting port is set to, e.g., "1", and the bit associated with a port not to be a transmitting port is set to "0".

When the port ID is stored as a destination in the internal header of the frame received from the transmission distribution table access circuit 400, the transmission port bitmap setting portion 405 sets the transmission bitmap such that the bit associated with the port with the aforementioned port ID is "1" and other bits are "0".

In addition, when a flooding identifier is stored as a destination in the internal header of the frame received from the transmission distribution table access circuit 400, the transmission port bitmap setting portion 405 sets such that the bit associated with the port not composing the LAG with LAG ID "1" is "1", the bit associated with a port with port ID obtained from the first distribution table 330 or the second distribution table 335 by the transmission distribution table access circuit 400 among the ports composing the LAG with LAG ID "1" is "1", and the bit associated with other ports composing the LAG with LAG ID "1" is "0". Note that, ports not composing the LAG with LAG ID "1" but composing a LAG with another LAG ID are set such that a bit associated with a port with a predetermined port ID in the LAG with another LAG ID is "1" and a bit associated with other ports composing the other LAG with the LAG ID "1" is "0" in the same operation as described above. In this case, the transmitting unit 40 has the first distribution table 330 and the second distribution table 335 which store port IDs of the ports composing the aforementioned LAG with another LAG ID so as to be associated with the distributed ID.

The frame of which transmission bitmap has been set is provided to the I/F circuit 20 by the transmission port bitmap setting portion 405.

The I/F circuit 20 receives the frame from the transmission port bitmap setting portion 405 and then transmits the frame from the port associated with the bit which is set to "1" in the transmission bitmap.

Operation of Switching Hub

FIG. 5A shows a schematic operation of the switching hub in the present embodiment, FIG. 5B shows a data structure of a first distribution table in the present embodiment, and FIG. 5C shows a data structure of a second distribution table in the present embodiment.

As shown in FIG. 5A, the switching hub 1 is provided with line cards 2, 2a, 2b and 2c. The port 10 of the line card 2 is connected to the transmission line 4 and the port 13 is connected to the relay path 3. Likewise, the port 11 of the line card 2a is connected to the transmission line 5 and the port 14 is connected to the relay path 3. In addition, a port 17 of the line card 2b is connected to a transmission line 7 and a port 15 is connected to the relay path 3. Furthermore, a port 18 of the line card 2c is connected to a transmission line 8 and a port 16 is connected to the relay path 3. Here, the port ID of the port 10 is "1/1", that of the port 11 is "3/1", that of the port 17 is "4/1" and that of the port 18 is "5/1". Then, the ports 11, 17 and 18 compose a LAG.

As shown in FIG. 5B, the first distribution table 330, which is used when failure does not occur in a port or when plural transmitting ports currently in use are continuously used without change, stores the port IDs so as to be associated with the distributed IDs. When failure does not occur in the port, the first distribution table 330 stores, e.g., the port ID "3/1" associated with the distributed IDs "0", "3" and "6", the port ID "4/1" associated with the distributed IDs "1", "4" and "7", and the port ID "5/1" associated with the distributed IDs "2" and "5".

Flooding Relay: the Case where Failure does not Occur in a Port

Firstly, the case where the frame is relayed by flooding will be explained. As an example, when the port 10 receives a frame, the distributed ID calculation portion 300 included in the line card 2 calculates a distributed ID based on a MAC address included in the frame. When the value of the distributed ID calculated by the distributed ID calculation portion 300 is, e.g., "1", the distributed ID calculation portion 300 adds the distributed ID "1" to the frame. The distribution table identification information adding portion 305 included in the line card 2 then adds the first table identification information to the frame since failure does not currently occur in the port.

Each of the transmission distribution table access circuits 400 of the line cards 2a to 2c which received the frame with the first table identification information added thereto refers to the first distribution table 330. In the first distribution table 330 shown in FIG. 5B, since the port ID associated with the distributed ID "1" is "4/1", the frame is transmitted from the port 17 of the line card 2b.

Flooding Relay: the Case after Failure Occurs in a Port

When failure occurs in the port 17, the second distribution table 335 stores, e.g., the port ID "3/1" associated with the distributed IDs "0", "2", "4" and "6", and the port ID "5/1" associated with the distributed IDs "1", "3", "5" and "7". In other words, the second distribution table 335 stores port IDs excluding that of the port in which failure occurs.

Then, when the port 10 receives a frame, the distributed ID calculation portion 300 included in the line card 2 calculates a distributed ID based on a MAC address included in the frame. When the value of the distributed ID calculated by the distributed ID calculation portion 300 is, e.g., "1", the distributed ID calculation portion 300 adds the distributed ID "1" to the frame. The distribution table identification information adding portion 305 included in the line card 2 then adds the second table identification information to the frame since failure currently occurs in the port.

Each of the transmission distribution table access circuits 400 of the line cards 2a to 2c which received the frame with the second table identification information added thereto refers to the second distribution table 335. In the second distribution table 335 shown in FIG. 5C, since the port ID associated with the distributed ID "1" is "5/1", the frame is transmitted from the port 18 of the line card 2c.

The distribution table identification information adding portion 305 included in the line card 2 then adds the first table identification information to a newly received frame when the failure of the port 17 is recovered. The switching hub 1 in the present embodiment thereby switches the port to transmit the frame.

Forwarding Relay

Next, the case where the frame is relayed by forwarding will be explained. As an example, when the port 10 receives the frame, the FDB access circuit 310 of the receiving unit 30 refers to the FDB 315 and obtains the port ID or the LAG ID which is stored in the FDB 315 so as to be associated with a MAC address included in the received frame. When it obtains the LAG ID, the LAG distribution table access circuit 320 of the receiving unit 30 refers to the LAG distribution table 332 and obtains the port ID stored in the LAG distribution table 332 in association with the LAG ID and the distributed ID. Then, the receiving unit 30 forwards the frame to the line card which has a port identified by the obtained port ID. Then, the transmitting unit 40 of the line card receiving the frame transmits the frame received from the receiving unit 30 to outside from the port identified by the port ID stored in the internal headers of the frame.

Effect of the Embodiment

Since the switching hub 1 in the embodiment of the invention is provided with the line card 2 preliminarily including the first distribution table 330 and the second distribution table 335, the transmitting port to transmit the frame can be simultaneously switched by only switching a table to be used from the first distribution table 330 to the second distribution table 335 or the other way round when failure such as damage occurs in the transmitting port to transmit the frame and the aforementioned transmitting port is subsequently recovered or when the transmitting port currently in use is changed to another transmitting port and the other transmitting port is subsequently changed back to the original transmitting port. This allows the switching hub 1 to switch the port without frame loss when the transmitting port is recovered after failure such as damage occurs in any of the transmitting ports or after the transmitting port currently in use is changed to another port.

In addition, since the switching hub 1 in the present embodiment can switch the table to be used from the first distribution table 330 to the second distribution table 335 when a port used for transmission is manually switched from one port to another, it is possible to switch the port without frame loss (i.e., degeneracy is possible without frame loss). As a result, a line card can be smoothly changed without losing the frame when the damaged line card among the plural line cards included in the switching hub 1 is replaced.

Although the embodiment of the invention has been described, the invention according to claims is not to be limited to the above-mentioned embodiment. Further, please note that not all combinations of the features described in the embodiment are not necessary to solve the problem of the invention.

Although the invention has been described with respect to the specific embodiment for complete and clear disclosure, the appended claims are not to be therefore limited but are to be construed as embodying all modifications and alternative constructions that may occur to one skilled in the art which fairly fall within the basic teaching herein set forth.

What is claimed is:

1. A switching hub, comprising:
a plurality of line cards, each line card comprises a plurality of ports comprising receiving ports for receiving a frame from outside and transmitting ports for transmitting the frame to outside, at least a subset of the plurality of ports provided on the plurality of line cards composing a link aggregation group (LAG), each line card further comprises;
a receiving unit for receiving the frame from outside and a transmitting unit for transmitting the frame to outside,
the receiving unit comprises:
  a distributed identifier (ID) calculation portion for calculating a distributed ID based on the frame received by one of the receiving ports of the plurality of ports and adding the distributed ID to the frame; and
  a distribution table identification information adding portion for adding first table identification information for identifying a first distribution table or second table identification information for identifying a second distribution table to the frame,
the transmitting unit comprises:
  the first distribution table that stores a port identifier (ID) for identifying a transmitting port for transmitting the frame associated with the distributed ID to outside;
  the second distribution table that stores the port ID associated with the distributed ID so that a correspondence relation is different from that of the first distribution table, the first and second distribution tables storing port IDs of the ports composing the LAG so as to be associated with the distributed ID;
  a transmission distribution table access portion for obtaining the port ID stored in the first or second distribution table so as to be associated with the distributed ID that is added to the frame by referring to the first distribution table when the first table identification information is added to the frame and by referring to the second distribution table when the second table identification information is added to the frame, the transmission distribution table access portion referring to the first or second distribution table in a case that the frame is relayed by flooding,
the receiving unit further comprises:
  a FDB (Forwarding Database) for storing a MAC (Media Access Control) address and the port ID or a LAG ID for identifying the LAG as registered data;
  a FDB access circuit having a function of searching a destination in the FDB;
  a LAG distribution table for distributing the LAG ID, the distributed ID and the port ID so as to be associated with each other; and a reception distribution table access portion for obtaining the port ID stored so as to be associated with the LAG ID detected by the FDB access circuit and with the distributed ID added in the frame by referring to the LAG distribution table.

2. The switching hub according to claim 1, wherein the first and the second distribution tables being provided for a same LAG.

3. A line card provided in a switching hub, comprising:
a plurality of ports comprising receiving ports for receiving a frame from outside and transmitting ports for transmitting the frame to outside, at least a subset of the plurality of ports composing a link aggregation group (LAG);
a receiving unit for receiving the frame from outside and a transmitting unit for transmitting the frame to outside,
the receiving unit comprises:
    a distributed identifier (ID) calculation portion for calculating a distributed ID based on the frame received by one of the receiving ports of the plurality of ports and adding the distributed ID to the frame; and
    a distribution table identification information adding portion for adding first table identification information for identifying a first distribution table or second table identification information for identifying a second distribution table to the frame;
the transmitting unit comprises:
    the first distribution table that stores a port identifier (ID) for identifying a transmitting port for transmitting the frame associated with the distributed ID to outside;
    the second distribution table that stores the port ID associated with the distributed ID so that a correspondence relation is different from that of the first distribution table, the first and second distribution tables storing port IDs of the ports composing the LAG so as to be associated with the distributed ID;
and
    a transmission distribution table access portion for obtaining the port ID stored in the first or second distribution table so as to be associated with the distributed ID that is added to the frame by referring to the first distribution table when the first table identification information is added to the frame and by referring to the second distribution table when the second table identification information is added to the frame, the transmission distribution table access portion referring to the first or second distribution table in a case that the frame is relayed by flooding,
the receiving unit further comprises:
    a FDB (Forwarding Database) for storing a MAC (Media Access Control) address and the port ID or a LAG ID for identifying the LAG as registered data;
    a FDB access circuit having a function of searching a destination in the FDB;
    a LAG distribution table for distributing the LAG ID, the distributed ID and the port ID so as to be associated with each other; and
    a reception distribution table access portion for obtaining the port ID stored so as to be associated with the LAG ID detected by the FDB access circuit and with the distributed ID added in the frame, by referring to the LAG distribution table.

4. The line card according to claim 3, wherein the first and the second distribution tables being provided for a same LAG.

5. A frame relay method, comprising:
calculating a distributed ID based on a frame received by one of a plurality of receiving ports and adding the distributed ID to the frame, the receiving port receiving the frame from outside, the plurality of receiving ports being located on a plurality of line cards in a switching hub, where each line card comprises receiving ports for receiving a frame from outside and transmitting ports for transmitting the frame to outside, at least a subset of the plurality of receiving ports provided on the plurality of line cards composing a link aggregation group (LAG);
adding first or second table identification information to the frame, the first table identification information identifying a first distribution table that stores a port identifier (ID) for identifying a transmitting port for transmitting the frame so as to be associated with the distributed ID and the second table identification information identifying a second distribution table that stores the port ID associated with the distributed ID so that a correspondence relation is different from that of the first distribution table, the first and second distribution tables storing port IDs of the ports composing the LAG so as to be associated with the distributed ID;
obtaining the port ID stored in the first or second distribution table so as to be associated with the distributed ID that is added to the frame by referring to the first distribution table when the first table identification information is added to the frame and by referring to the second distribution table when the second table identification information is added to the frame, the first or second distribution table is referenced in a case that the frame is relayed by flooding;
storing a MAC (Media Access Control) address and the port ID or a LAG ID for identifying the LAG as registered data in a forwarding database (FDB);
searching a destination in the FDB;
storing the LAG ID, the distributed ID and the port ID so as to be associated with each other in a LAG distribution table; and
obtaining the port ID stored so as to be associated with the LAG ID and with the distributed ID added in the frame by referring to the LAG distribution table.

6. The frame relay method according to claim 5, wherein the first and the second distribution tables being provided for a same LAG.

* * * * *